UNITED STATES PATENT OFFICE.

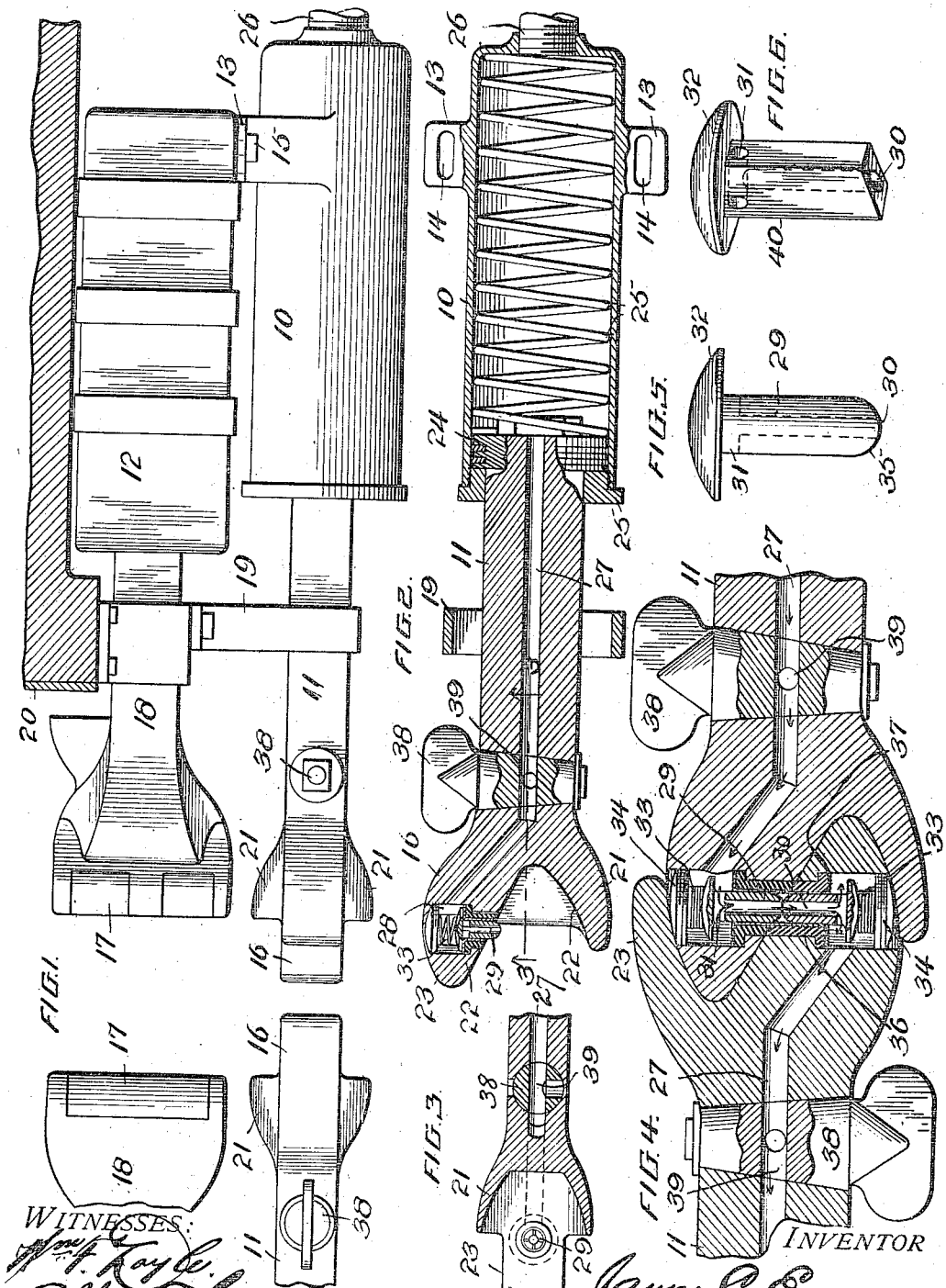

JAMES C. EVANS, OF SHAMOKIN, PENNSYLVANIA.

AUTOMATIC TRAIN-PIPE COUPLING.

982,943.

Specification of Letters Patent.

Patented Jan. 31, 1911.

Application filed November 19, 1910. Serial No. 593,217.

*To all whom it may concern:*

Be it known that I, JAMES C. EVANS, a citizen of the United States, residing at Shamokin, county of Northumberland, State of Pennsylvania, have invented certain new and useful Improvements in Automatic Train-Pipe Couplings, of which the following is a specification, reference being had therein to the accompanying drawing.

This invention relates to an automatic train pipe coupling and particularly to a structure adapted to be automatically connected when adjoining cars are coupled together.

The invention has for an object to provide means by which the fluid pressure coupling is retained in extended position under the fluid pressure so as to secure a firm contact and retain it under ordinary conditions of use.

A further object of the invention is to provide such a coupling provided with a cylinder having a piston therein from which a coupling head extends and means for introducing fluid pressure into said cylinder and permitting its feed through said head to a contact member.

Other and further objects and advantages of the invention will be hereinafter set forth and the novel features thereof defined by the appended claims.

In the drawing—Figure 1 is a side elevation showing the mounting of the pipe coupling relative to the car coupler; Fig. 2 is a longitudinal section of one member of the pipe coupling; Fig. 3 is a detail section on line 3—3 of Fig. 2; Fig. 4 is a detail horizontal section of the pipe coupling members engaged; Fig. 5 is an enlarged detail of the valve carried by the pipe coupling head; and Fig. 6 is a modified form of this valve.

Like numerals of reference refer to like parts in the several figures of the drawing.

The train pipe coupling members are identical in construction and may be mounted in any desired manner, one form of which is shown in Fig. 1 where the cylinder 10, which carries the bar 11 is supported from the draw-head bearing 12 by means of lugs 13 provided with elongated slots 14 through which securing bolts 15 extend into the support 12. This permits the necessary lateral movement of the cylinder 10 in coupling when the members are not in alinement.

The head 16 of the train pipe coupling is disposed beneath the ordinary car coupling 17 carried by the draw bar 18 and extended beyond the same as shown in Fig. 1. The bar 11 is supported in the hanger 19 carried by the car frame 20 to permit both a lateral and vertical movement thereof. The head 16 is also provided at each side with an extension 21 having an inclined inner face 22 by which the nose 23 of the opposite coupling is guided into position.

The supporting bar 11 for the pipe coupling is provided within the cylinder 10 with a packed piston 24 which is normally held at one end of the cylinder by the tension spring 25 therein and this spring provides a yielding contact when the fluid pressure is not introduced. One end of the cylinder is provided with a removable cap 25 threaded therein and the opposite end with a train pipe connection 26 by which fluid pressure, such as steam, air or gas, may be introduced. The supporting bar 11 is provided with an aperture 27 extending therethrough to the nose 23 of the head and there communicates with a chamber 28 which is provided with a cut-off valve 29 adapted to be operated by contact with the opposite head as shown in Fig. 4. This valve may be of the construction shown in Figs. 4 and 5 wherein it is round and provided with a central passage 30 and communicating passages 31 at its inner end. This end of the valve is provided with a head 32 against which a tension spring 33 acts to project the valve, this spring being adjusted in tension by the nut 34 threaded into the head as shown in Fig. 4. The opposite end of the valve is provided with a curved face 35 adapted to coöperate with a similar face upon the valve carried by the opposite coupling member and thus depress the valves to establish a fluid pressure passage between the coupled heads. These valves may be mounted in a collar 36 carried by the heads which is provided with an inner packing face 37 to provide air-tight contact with the heads 32 of the valves when they are closed. The bars 11 may each be provided with a turn-cock 38 having a 3-way passage 39, as shown in Fig. 3, by which, when the coupling is disconnected, the escape of air may be cut off or allowed to escape when it is desired to release the brake upon a separated car.

In Fig. 6, a modified form of the coupling head valve is shown at 40 and is substantially the same in construction as the valve 29 except that the stem thereof is angular to prevent the turning of the valve.

In the operation of the invention, the piston is normally held in contact with one end of the cylinder in order to prevent a violent blow against the head when the fluid pressure is introduced and is subsequently held in this position by the fluid pressure until the coupling heads contact when the valves therein are opened to permit the escape of a portion of the fluid pressure into the train pipes. This allows a yielding pressure upon the piston against the fluid pressure of the cylinder and the spring therein which provides a more positive contact between the coupling heads, maintaining them in feeding relation during all ordinary conditions of traffic and one in which when the train pressure is applied exerts a greater tension than can be secured by the use of a spring which, in this instance, only acts when the fluid pressure is released from the cylinder. It is therefore believed that this invention presents a simple, efficient and economical construction of train pipe connection readily adapted for application to cars already equipped with the usual couplings and also avoids the use of any flexible connections which are liable to burst under high pressures.

Having described my invention and set forth its merits, what I claim and desire to secure by Letters Patent is—

1. In a train pipe coupling, means for supplying fluid pressure thereto, means whereby the coupling is retained in extended position by said fluid pressure, and means carried by said coupling and adapted to be operated by a contact member to allow the escape of fluid pressure therefrom.

2. In a train pipe coupling, a cylinder, a piston therein, a coupling head connected to said piston, means for introducing fluid pressure into said cylinder and permitting its feeding through said head, a tension spring disposed within said cylinder between said piston and the opposite end thereof, and an automatically operated escape valve carried by said head.

3. In a train pipe coupling, a cylinder, a piston therein, a coupling head connected to said piston, means for introducing fluid pressure into said cylinder and permitting its feeding through said head, a tension spring disposed within said cylinder between said piston and the opposite end thereof, an automatically operated escape valve carried by said head, and a turn-cock carried by the head to control the feed to said valve or permit escape through said cock.

4. In a train pipe coupling, a cylinder, a piston therein, a coupling head connected to said piston, means for introducing fluid pressure into said cylinder and permitting its feeding through said head, a tension spring disposed within said cylinder between said piston and the opposite end thereof, an automatically operated escape valve carried by said head, and oppositely disposed extensions carried by said head and provided with inclined guiding faces at opposite sides of said valve.

5. In a train pipe coupling, a cylinder, a piston therein, a supporting bar having a passage therethrough and carried by said piston, a coupling head at the opposite end of said bar, and an automatic valve carried by said head.

6. In a train pipe coupling, a cylinder, a piston therein, a supporting bar having a passage therethrough and carried by said piston, a coupling head at the opposite end of said bar, an automatic valve carried by said head, and a spring disposed within said cylinder between said piston and the opposite end thereof.

7. In a train pipe coupling, a cylinder, a piston therein, a supporting bar having a passage therethrough and carried by said piston, a coupling head at the opposite end of said bar, an automatic valve carried by said head, a spring disposed within said cylinder between said piston and the opposite end thereof, and means for mounting said cylinder for lateral movement.

8. In a train pipe coupling, a cylinder, a piston therein, a supporting bar having a passage therethrough and carried by said piston, a coupling head at the opposite end of said bar, a reciprocating valve mounted in said head and having a passage therethrough, and a tension spring to normally close said valve.

9. In a train pipe coupling, a cylinder, a piston therein, a supporting bar having a passage therethrough and carried by said piston, a coupling head at the opposite end of said bar, a reciprocating valve mounted in said head and having a passage therethrough, a tension spring to normally close said valve, a collar within which said valve reciprocates, and a packing carried by the inner face and interior of said collar.

In testimony whereof I affix my signature in presence of two witnesses.

JAMES C. EVANS.

Witnesses:
  GEO. W. JOHN,
  T. T. JOHN.